US012599861B2

(12) United States Patent (10) Patent No.: US 12,599,861 B2
Weiss et al. (45) Date of Patent: Apr. 14, 2026

(54) IMPINGING GAS SAMPLE WATER CONDENSER

(71) Applicant: Halliburton Energy Services, Inc., Houston, TX (US)

(72) Inventors: Steven Robert Weiss, Houston, TX (US); Mathew Dennis Rowe, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 213 days.

(21) Appl. No.: 18/403,308

(22) Filed: Jan. 3, 2024

(65) Prior Publication Data

US 2025/0214011 A1 Jul. 3, 2025

(51) Int. Cl.
| | |
|---|---|
| *B01D 45/08* | (2006.01) |
| *B01D 53/00* | (2006.01) |
| *B01D 53/26* | (2006.01) |
| *E21B 43/16* | (2006.01) |
| *F25B 21/02* | (2006.01) |

(52) U.S. Cl.
CPC ........... B01D 45/08 (2013.01); B01D 53/002 (2013.01); B01D 53/265 (2013.01); *B01D 2257/80* (2013.01); *E21B 43/16* (2013.01); *F25B 21/02* (2013.01); *F25B 2321/0212* (2013.01)

(58) Field of Classification Search
CPC ............... F25B 21/02; F25B 2321/021; F25B 2321/0212; B01D 2257/80; B01D 45/08; B01D 53/002; B01D 53/265; E21B 43/16
See application file for complete search history.

(56) References Cited

U.S. PATENT DOCUMENTS

| | | | | | |
|---|---|---|---|---|---|
| 4,363,642 | A | * | 12/1982 | Stahl | F24C 15/20 |
| | | | | | 96/255 |
| 6,474,073 | B1 | * | 11/2002 | Uetsuji | F25B 21/02 |
| | | | | | 62/3.2 |
| 6,490,869 | B1 | * | 12/2002 | Uetsuji | F25B 21/02 |
| | | | | | 62/3.3 |

(Continued)

FOREIGN PATENT DOCUMENTS

| | | |
|---|---|---|
| CN | 113546497 A | 10/2021 |
| JP | 2003313010 A | 11/2003 |

(Continued)

OTHER PUBLICATIONS

Obata, "Apparatus for manufacturing Ozone water", Nov. 6, 2003; USPTO, translation, all JP 2003-313010 (Year: 2003).*

(Continued)

*Primary Examiner* — Filip Zec
(74) *Attorney, Agent, or Firm* — Benjamin Ford; C. Tumey Law Group PLLC

(57) ABSTRACT

A fluid filter that includes a thermoelectric cooler with a cold side and a hot side, an impingement enclosure, disposed against the cold side that includes an inlet adapted to direct a fluid to flow towards the cold side at a first perpendicular angle, and an outlet adapted to direct the fluid to flow away the cold side at a second perpendicular angle, an outlet temperature sensor disposed at the outlet, and a controller operatively connected to the thermoelectric cooler, where the controller is configured to send a command to the thermoelectric cooler to change the power state of the thermoelectric cooler.

20 Claims, 7 Drawing Sheets

(56)                References Cited

U.S. PATENT DOCUMENTS

| | | | | |
|---|---|---|---|---|
| 9,234,682 | B2 * | 1/2016 | Edwards | F25B 21/04 |
| 10,471,227 | B1 * | 11/2019 | Morris | A61M 16/0833 |
| 11,067,483 | B2 * | 7/2021 | Sunada | B01D 53/268 |
| 11,202,987 | B2 * | 12/2021 | Henson | B01D 53/229 |
| 11,285,435 | B2 * | 3/2022 | Friesen | B01D 53/265 |
| 11,364,319 | B2 * | 6/2022 | Nien | A61L 9/20 |
| 2002/0162773 | A1 | 11/2002 | Kim et al. | |
| 2014/0109899 | A1 * | 4/2014 | Boucher | A61M 11/003 |
| | | | | 128/200.14 |
| 2016/0273355 | A1 | 9/2016 | Gosney et al. | |
| 2018/0272079 | A1 * | 9/2018 | Porter | A61M 16/0488 |
| 2019/0366016 | A1 * | 12/2019 | Leonard | A61M 11/04 |
| 2021/0031140 | A1 * | 2/2021 | Solanki | B01D 53/323 |
| 2022/0134342 | A1 * | 5/2022 | Zhou | F25D 17/06 |
| | | | | 209/11 |

FOREIGN PATENT DOCUMENTS

| | | | |
|---|---|---|---|
| KR | 20150049247 A | 5/2015 | |
| KR | 20190071914 A | 6/2019 | |

OTHER PUBLICATIONS

International Search Report and Written Opinion for International Patent Application No. PCT/US2024/012237 dated Sep. 26, 2024. PDF file. 9 pages.

* cited by examiner

THERMOELECTRIC COOLER 262

FLUID FILTER 250

IMPINGMENT ENCLOSURE 252

FAN 270

INLET 254

INFLUX 258

COLD SIDE 264

EFFLUX 260

HEATSINK 268

OUTLET 256

FLUID FILTER 250

HOT SIDE 266

INFLUX 258

EFFLUX 260

FAN 270

THERMOELECTRIC COOLER 262

HEATSINK 268

FLUID FILTER
250

THERMOELECTRIC
COOLER 262

HEATSINK
268

FLUID
IMPINGEMENT
372

COLD SIDE
264

IMPINGMENT
ENCLOSURE
252

BACKPLATE
253

INFLUX
258

INLET
254

OUTLET
256

EFFLUX
260

FLUID FILTER
250

THERMOELECTRIC
COOLER 262

HEATSINK
268

FLUID
IMPINGEMENT
372

COLD SIDE
264

IMPINGMENT
ENCLOSURE
252

BACKPLATE
253

INFLUX
258

INLET
254

OUTLET
256

EFFLUX
260

FLOW
DISRUPTER(S)
373

FLUID FILTER
*250*

COLD SIDE
*264*

THERMOELECTRIC
COOLER *262*

BACKPLATE
*253*

INFLUX
*258*

FLUID
IMPINGEMENT
*372*

HOT SIDE
*266*

AEROSOL(S)
*474*

IMPINGMENT
ENCLOSURE
*252*

EFFLUX
*260*

AEROSOL(S)
*474*

IMPINGING GAS SAMPLE WATER CONDENSER

BACKGROUND

The oil and gas industry may use boreholes as fluid conduits to access subterranean deposits of various fluids and minerals which may include hydrocarbons. A drilling operation may be utilized to construct the fluid conduits which are capable of producing hydrocarbons disposed in subterranean formations. Boreholes may be incrementally constructed as tapered sections, which sequentially extend into a subterranean formation. In some environments, subterranean deposits are dispersed as gases in formations. In such environments, liquids may be utilized to mix with, capture, and extract the gaseous hydrocarbons from the subterranean deposits.

BRIEF DESCRIPTION OF DRAWINGS

These drawings illustrate certain aspects of some examples of the present disclosure and should not be used to limit or define the disclosure.

DETAILED DESCRIPTION

Overview and Advantages

In general, this application discloses one or more embodiments of systems and methods for filtering a (mostly) gaseous fluid to remove unwanted aerosols. By removing unwanted aerosols from the gas, a purer gas is obtained, upon which more accurate analysis may be performed.

In conventional drilling environments, gaseous hydrocarbons are extracted from subterranean deposits by mixing the gaseous hydrocarbons with liquids (e.g., drilling mud), cycling the liquids to the surface, then separating the gas from the liquid. After the gas is isolated, the gas is then analyzed to determine its chemical composition of hydrocarbons. As a non-limiting example, analysis is performed to identify the proportional presence of different gases such as helium, hydrogen, oxygen, nitrogen, carbon dioxide, alkanes (e.g., methane, propane, butane, octane, etc.), alkenes (e.g., ethene, pentene, etc.), and/or any other gaseous hydrocarbons.

However, conventional methods to separate gases from liquids on a large scale (e.g., using a degasser) often leave particulate matter (e.g., aerosols, vapor, dust, etc.) dispersed throughout the gaseous output. Consequently, when attempting to analyze the gaseous matter for chemical composition, the lingering debris in the gas may (i) reduce accuracy of the results, (ii) damage the analytical equipment, and/or (iii) preclude the use of more sophisticated and sensitive analytical equipment.

Conventionally, to remove particulate matter, a coalescing filter may be used, but such a filter does not remove aerosols (or provide for dehumidification). Alternatively, a membrane may be used to filter aerosols, but such a membrane requires maintenance to be cleaned or replaced, thus requiring personnel.

As disclosed herein, systems and methods are provided to filter a gas sample (used for analysis) that removes aerosols, dehumidifies the gas, and requires little (or no) maintenance for continual use. Specifically, to remove aerosols, the gas may be (i) cooled to remove vapor, and/or (ii) forced to undergo fluid impingement to further separate the gaseous matter from denser matter (solids and liquids). As a result, the remaining gas is purer and allows for more accurate and precise analysis.

FIG. 1A

Figure 1A:
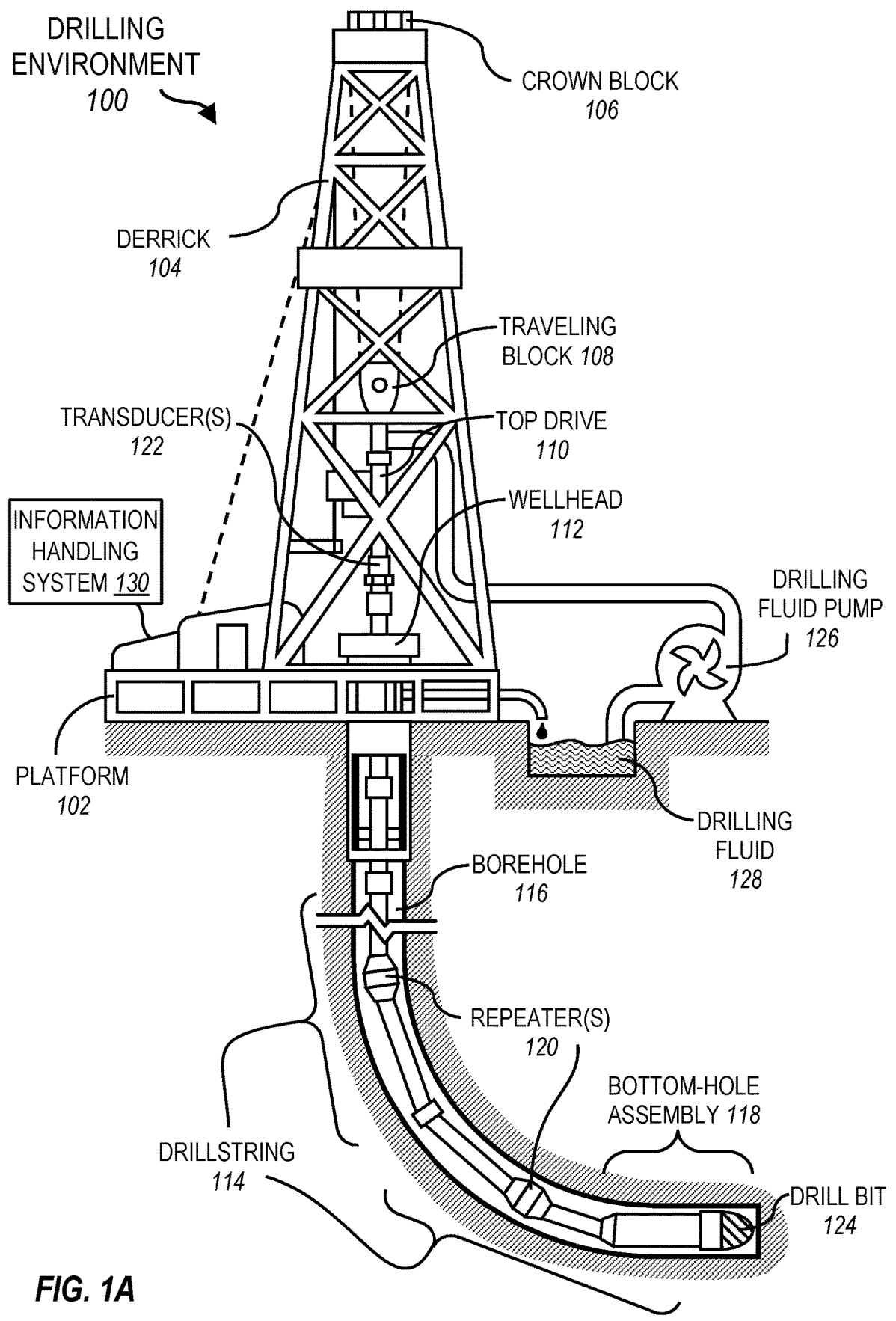
FIG. 1A is a diagram of an example drilling environment.

FIG. 1A is a diagram of an example drilling environment. Drilling environment 100 may include platform 102 that supports derrick 104 having a traveling block 108 for raising and lowering top drive 110 and drillstring 114. Top drive 110 supports and rotates drillstring 114 as it is lowered through wellhead 112. In turn, drill bit 124, located at the end of drillstring 114, may create borehole 116. Each of these components is described below.

Platform 102 is a structure which may be used to support one or more other components of drilling environment 100 (e.g., derrick 104). Platform 102 may be designed and constructed from suitable materials (e.g., concrete) which are able to withstand the forces applied by other components (e.g., the weight and counterforces experienced by derrick 104). In any embodiment, platform 102 may be constructed to provide a uniform surface for drilling operations in drilling environment 100.

Derrick 104 is a structure which may support, contain, and/or otherwise facilitate the operation of one or more pieces of the drilling equipment. In any embodiment, derrick 104 may provide support for crown block 106, traveling block 108, and/or any part connected to (and including) drillstring 114. Derrick 104 may be constructed from any suitable materials (e.g., steel) to provide the strength necessary to support those components.

Crown block 106 is one or more simple machine(s) which may be rigidly affixed to derrick 104 and include a set of pulleys (e.g., a "block"), threaded (e.g., "reeved") with a drilling line (e.g., a steel cable), to provide mechanical advantage. Crown block 106 may be disposed vertically above traveling block 108, where traveling block 108 is threaded with the same drilling line.

Traveling block 108 is one or more simple machine(s) which may be movably affixed to derrick 104 and include a set of pulleys, threaded with a drilling line, to provide mechanical advantage. Traveling block 108 may be disposed vertically below crown block 106, where crown block 106 is threaded with the same drilling line. In any embodiment, traveling block 108 may be mechanically coupled to drillstring 114 (e.g., via top drive 110) and allow for drillstring 114 (and/or any component thereof) to be lifted from (and out of) borehole 116. Both crown block 106 and traveling block 108 may use a series of parallel pulleys (e.g., in a "block and tackle" arrangement) to achieve significant mechanical advantage, allowing for the drillstring to handle greater loads (compared to a configuration that uses nonparallel tension). Traveling block 108 may move vertically (e.g., up, down) within derrick 104 via the extension and retraction of the drilling line.

Top drive 110 is a machine which may be configured to rotate drillstring 114. Top drive 110 may be affixed to traveling block 108 and configured to move vertically within derrick 104 (e.g., along with traveling block 108). In any embodiment, the rotation of drillstring 114 (caused by top drive 110) may allow for drillstring 114 to carve borehole 116. Top drive 110 may use one or more motor(s) and gearing mechanism(s) to cause rotations of drillstring 114. In any embodiment, a rotary table (not shown) and a "Kelly" drive (not shown) may be used in addition to, or instead of, top drive 110.

Wellhead 112 is a machine which may include one or more pipes, caps, and/or valves to provide pressure control for contents within borehole 116 (e.g., when fluidly connected to a well (not shown)). In any embodiment, during drilling, wellhead 112 may be equipped with a blowout preventer (not shown) to prevent the flow of higher-pressure fluids (in borehole 116) from escaping to the surface in an uncontrolled manner. Wellhead 112 may be equipped with other ports and/or sensors to monitor pressures within borehole 116 and/or otherwise facilitate drilling operations.

Drillstring 114 is a machine which may be used to carve borehole 116 and/or gather data from borehole 116 and the surrounding geology. Drillstring 114 may include one or more drillpipe(s), one or more repeater(s) 120, and bottom-hole assembly 118. Drillstring 114 may rotate (e.g., via top drive 110) to form and deepen borehole 116 (e.g., via drill bit 124) and/or via one or more motor(s) attached to drill-string 114.

Borehole 116 is a hole in the ground which may be formed by drillstring 114 (and one or more components thereof). Borehole 116 may be partially or fully lined with casing to protect the surrounding ground from the contents of borehole 116, and conversely, to protect borehole 116 from the surrounding ground.

Bottom-hole assembly 118 is a machine which may be equipped with one or more tools for creating, providing structure, and maintaining borehole 116, as well as one or more tools for measuring the surrounding environment (e.g., measurement while drilling (MWD), logging while drilling (LWD)). In any embodiment, bottom-hole assembly 118 may be disposed at (or near) the end of drillstring 114 (e.g., in the most "downhole" portion of borehole 116).

Non-limiting examples of tools that may be included in bottom-hole assembly 118 include a drill bit (e.g., drill bit 124), casing tools (e.g., a shifting tool), a plugging tool, a mud motor, a drill collar (thick-walled steel pipes that provide weight and rigidity to aid the drilling process), actuators (and pistons attached thereto), a steering system, and any measurement tool (e.g., sensors, probes, particle generators, etc.).

Further, bottom-hole assembly 118 may include a telemetry sub to maintain a communications link with the surface (e.g., with information handling system 201). Such telemetry communications may be used for (i) transferring tool measurement data from bottom-hole assembly 118 to surface receivers, and/or (ii) receiving commands (from the surface) to bottom-hole assembly 118 (e.g., for use of one or more tool(s) in bottom-hole assembly 118).

Non-limiting examples of techniques for transferring tool measurement data (to the surface) include mud pulse telemetry and through-wall acoustic signaling. For through-wall acoustic signaling, one or more repeater(s) 120 may detect, amplify, and re-transmit signals from bottom-hole assembly

118 to the surface (e.g., to information handling system 201), and conversely, from the surface (e.g., from information handling system 201) to bottom-hole assembly 118.

Repeater 120 is a device which may be used to receive and send signals from one component of drilling environment 100 to another component of drilling environment 100. As a non-limiting example, repeater 120 may be used to receive a signal from a tool on bottom-hole assembly 118 and send that signal to information handling system 201. Two or more repeaters 120 may be used together, in series, such that a signal to/from bottom-hole assembly 118 may be relayed through two or more repeaters 120 before reaching its destination.

Transducer 122 is a device which may be configured to convert non-digital data (e.g., vibrations, other analog data) into a digital form suitable for information handling system 201. As a non-limiting example, one or more transducer(s) 122 may convert signals between mechanical and electrical forms, enabling information handling system 201 to receive the signals from a telemetry sub, on bottom-hole assembly 118, and conversely, transmit a downlink signal to the telemetry sub on bottom-hole assembly 118. In any embodiment, transducer 122 may be located at the surface and/or any part of drillstring 114 (e.g., as part of bottom-hole assembly 118).

Drill bit 124 is a machine which may be used to cut through, scrape, and/or crush (i.e., break apart) materials in the ground (e.g., rocks, dirt, clay, etc.). Drill bit 124 may be disposed at the frontmost point of drillstring 114 and bottom-hole assembly 118. In any embodiment, drill bit 124 may include one or more cutting edges (e.g., hardened metal points, surfaces, blades, protrusions, etc.) to form a geometry which aids in breaking ground materials loose and further crushing that material into smaller sizes. In any embodiment, drill bit 124 may be rotated and forced into (i.e., pushed against) the ground material to cause the cutting, scraping, and crushing action. The rotations of drill bit 124 may be caused by top drive 110 and/or one or more motor(s) located on drillstring 114 (e.g., on bottom-hole assembly 118).

Drilling fluid pump 126 is a machine that may be used to circulate drilling fluid 128 from a reservoir, through a feed pipe, to derrick 104, to the interior of drillstring 114, out through drill bit 124 (through orifices, not shown), back upward through borehole 116 (around drillstring 114), and back into the reservoir. In any embodiment, any appropriate drilling fluid pump 126 may be used (e.g., centrifugal, gear, etc.) which is powered by any suitable means (e.g., electricity, combustible fuel, etc.).

Drilling fluid 128 is a liquid which may be pumped through drillstring 114 and borehole 116 to collect drill cuttings, debris, and/or other ground material from the end of borehole 116 (e.g., the volume most recently hollowed by drill bit 124). Further, drilling fluid 128 may provide conductive cooling to drill bit 124 (and/or bottom-hole assembly 118). In any embodiment, drilling fluid 128 may be circulated via drilling fluid pump 126 and filtered to remove unwanted debris.

Information handling system 130 is a hardware computing system which may be operatively connected to drillstring 114 (and/or other various components of the drilling environment). In any embodiment, information handling system 130 may utilize any suitable form of wired and/or wireless communication to send and/or receive data to and/or from other components of drilling environment 100. In any embodiment, information handling system 130 may receive a digital telemetry signal, demodulate the signal, display data (e.g., via a visual output device), and/or store the data. In any embodiment, information handling system 130 may send a signal (with data) to one or more components of drilling environment 100 (e.g., to control one or more tools on bottom-hole assembly 118).

In any embodiment, information handling system 130 may be utilized to perform various steps, methods, and techniques disclosed herein (e.g., via the execution of software). In any embodiment, information handling system 130 may include one or more processor(s), cache, memory, storage, and/or one or more peripheral device(s). Any two or more of these components may be operatively connected via a system bus that provides a means for transferring data between those components.

FIG. 1B

Figure 1B:
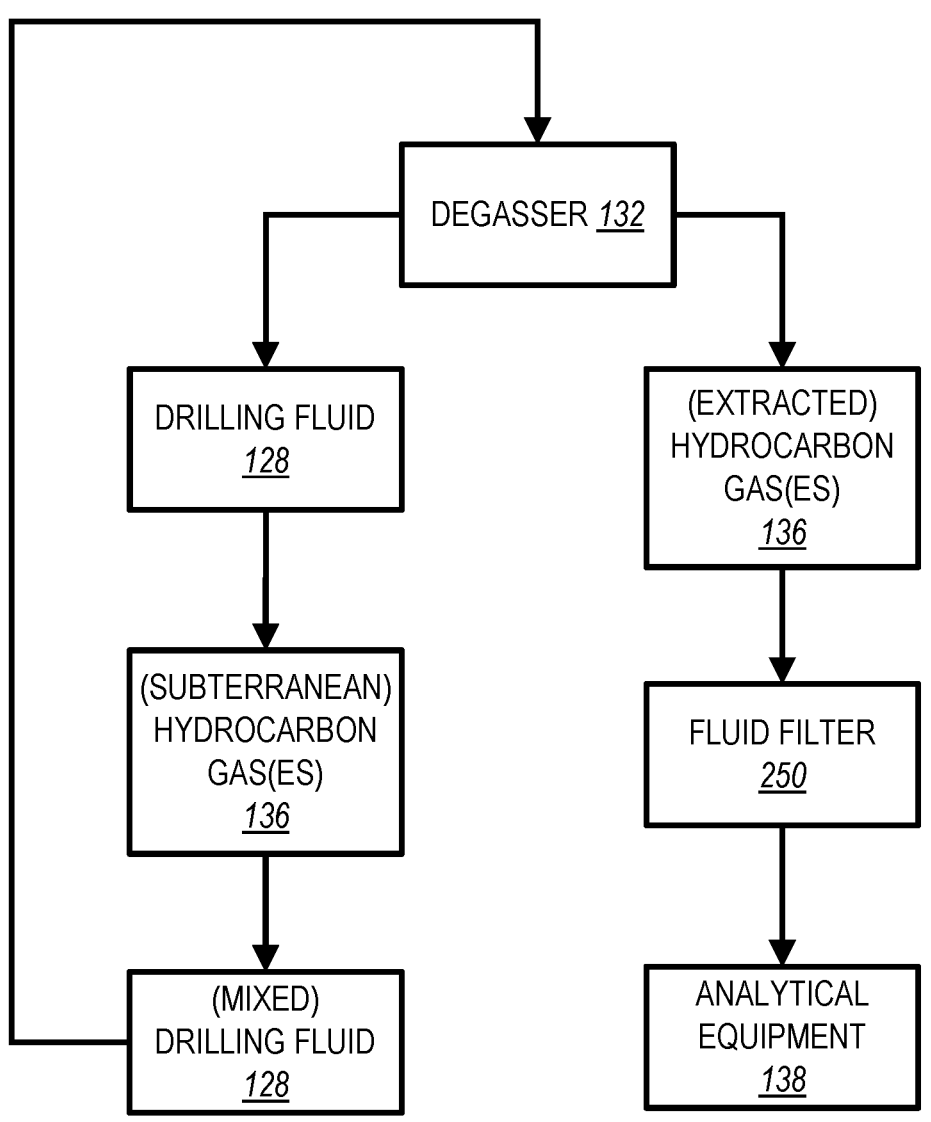
FIG. 1B is a diagram of the processing of drilling fluid to extract hydrocarbon gases.

FIG. 1B is a diagram of the processing of drilling fluid to extract hydrocarbon gases.

In any embodiment, drilling fluid 128 is pumped down and into borehole 116, to mix with and capture (subterranean) hydrocarbon gases 136 from a subterranean formation (not shown). The (mixed) drilling fluid 128 is circulated back to the surface and processed by degasser 132 to separate (mixed) drilling fluid 128 into (i) drilling fluid 128 and (ii) (extracted) hydrocarbon gases 136. In turn, drilling fluid 128 may be circulated back into borehole 116 for further capture of (subterranean) hydrocarbon gases 136.

A sample of (extracted) hydrocarbon gas 136 is diverted for analysis by analytical equipment 138 (e.g., to identify chemical composition). However, hydrocarbon gases 136 (as separated by degasser 132) contain unwanted aerosols 474 (e.g., water vapor) that hinder the analysis performed by analytical equipment 138. Accordingly, (extracted) hydrocarbon gas 136 is pumped through fluid filter 250 to further remove aerosols 474 before being provided to analytical equipment 138.

Further details regarding fluid filter 250 may be found in the description of FIGS. 2A, 2B, 3A, 3B, 4, and 5.

FIGS. 2A-2B

Figure 2A:
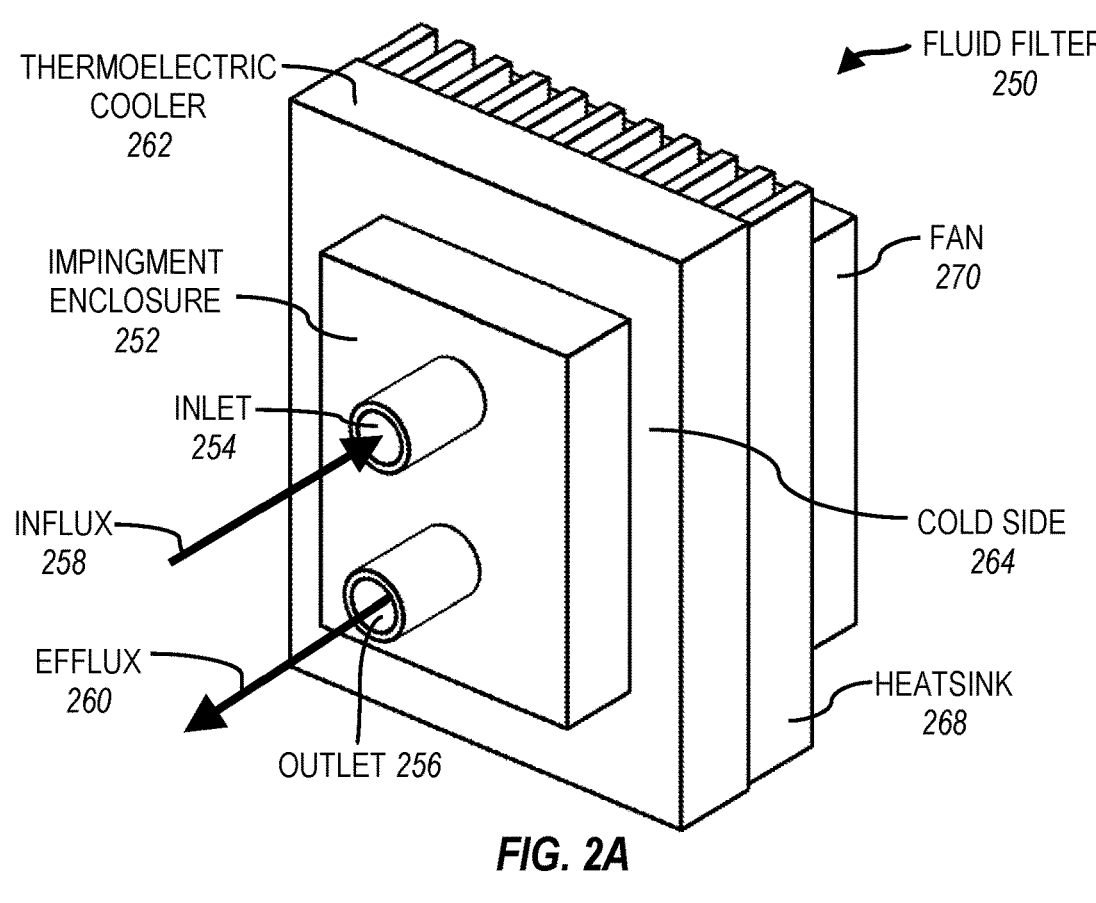
FIG. 2A is a diagram of a fluid filter viewed from the front side.
Figure 2B:
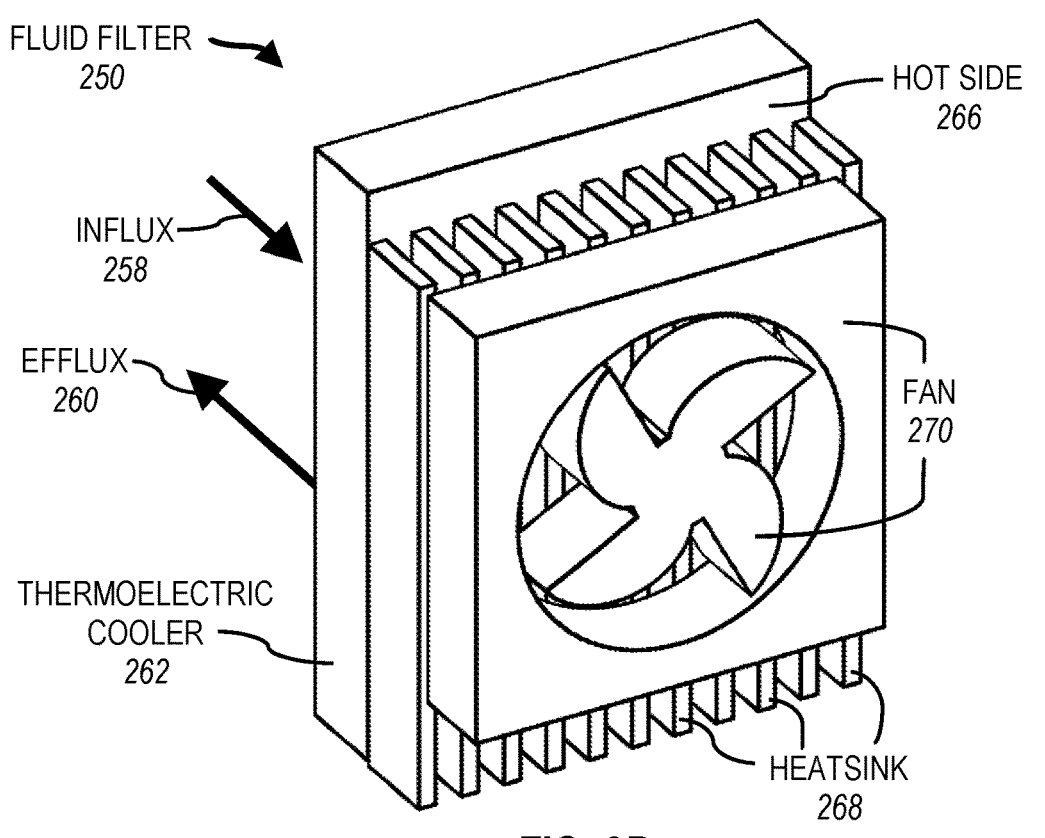
FIG. 2B is a diagram of a fluid filter viewed from the back side.

FIG. 2A is a diagram of a fluid filter viewed from the front side. FIG. 2B is a diagram of a fluid filter viewed from the back side.

Fluid filter 250 is a device which is configured to remove aerosols 474 from a fluid flowing therethrough (e.g., extracted hydrocarbon gases 136). In any embodiment, fluid filter 250 may remove aerosols 474 via fluid impingement 372 and/or heat removal (i.e., "cooling"). Thus, fluid filter 250 may include an impingement enclosure 252, thermoelectric cooler 262, and/or any other components to aid in the removal of aerosols 474.

Impingement enclosure 252 is a device that forces a fluid to undergo fluid impingement 372 when flowing therein. In any embodiment, impingement enclosure 252 may cause fluid impingement 372 by directing the fluid to flow in a different direction over a short distance (e.g., make a sharp right-angle turn). Impingement enclosure 252 may be constructed with inlet 254 and outlet 256 to facilitate influx 258 and efflux 260 of fluid, respectively. In any embodiment, impingement enclosure 252 may be constructed (partially or entirely) of one or more types of metal (e.g., steel, aluminum, copper, etc.).

Backplate 253 is surface of impingement enclosure 252 that is disposed against cold side 264 (of thermoelectric cooler 262). Due to the contact with cold side 264, heat is removed from backplate 253 making backplate (and impingement enclosure 252 as a whole) colder. In any embodiment, the inner side of backplate 253 (i.e., in the internal volume of impingement enclosure 252) is the surface against which fluid impingement 372 occurs.

Inlet 254 is an orifice, port, hole, and/or other conduit through with a fluid enters impingement enclosure 252 (i.e., as influx 258). In any embodiment, inlet 254 may be connected to one or more other tubes, pipes, or conduits for carrying the fluid. In any embodiment, inlet 254 may be constructed, assembled, or otherwise aligned to cause the fluid to flow at a perpendicular angle (i.e., substantially orthogonal, 85° to) 95° to backplate 253.

Outlet 256 is an orifice, port, hole, and/or other conduit through with a fluid exits impingement enclosure 252 (i.e., as efflux 260). In any embodiment, outlet 256 may be connected to one or more other tubes, pipes, or conduits for carrying the fluid.

Influx 258 is the flow of the fluid into impingement enclosure 252 through inlet 254.

Efflux 260 is the flow of the fluid out of impingement enclosure 252 through outlet 256.

Thermoelectric cooler 262 is an electronic device that creates a temperature difference between two sides of the device (i.e., from cold side 264 to hot side 266) when supplied with direct current. In any embodiment, the exterior facing sides of thermoelectric cooler 262 may be made be constructed from thermally conductive materials to aid in the transfer of heat into and out of the device.

Cold side 264 is the side of thermoelectric cooler 262 that is colder (i.e., having less heat) compared to hot side 266. In any embodiment, cold side 264 is thermally coupled to impingement enclosure 252 (e.g., at backplate 253). In turn, heat conductively flows from impingement enclosure 252 into cold side 264 of thermoelectric cooler 262 thereby making impingement enclosure 252 colder (i.e., having less heat). In any embodiment, cold side 264 (and backplate 253 affixed thereto) are colder than influx 258 when the fluid enters impingement enclosure 252 (i.e., a fluid temperature at influx 258 is greater than a backplate 253 temperature and/or impingement enclosure 252 temperature). When the fluid impacts backplate 253, heat is transferred from the fluid into backplate 253, which is then transferred into cold side 264.

Hot side 266 is the side of thermoelectric cooler 262 that is hotter (i.e., having more heat) compared to cold side 264. In any embodiment, hot side 266 is thermally coupled to heatsink 268. In turn, heat conductively flows from hot side 266 into heatsink 268.

Heatsink 268 is a component that absorbs heat from a thermally coupled component (i.e., via conduction) and releases that heat into the surrounding environment (i.e., via convection). In any embodiment, heatsink 268 may have one side (through which heat is conductively absorbed) that is shaped to mate with the geometric contours of another device (e.g., a flat side of heatsink 269 pressed against the flat contours of hot side 266). Additionally, in any embodiment, heatsink 268 may include one or more elongated arms (e.g., "fins") extending outward into the surrounding gas (e.g., air) to increase the contact surface area between heatsink 268 and that surrounding gas.

Figure 3A:
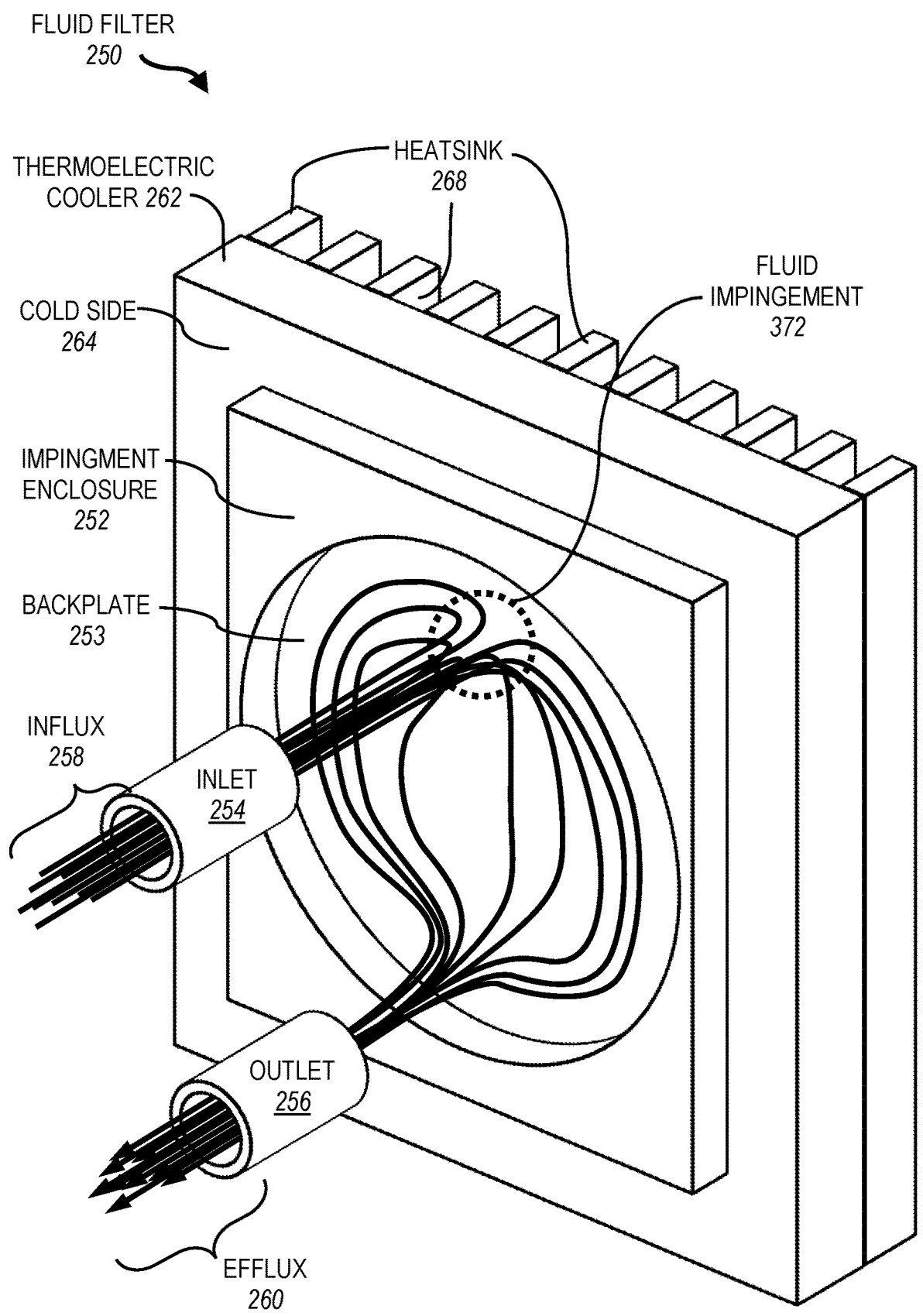
FIG. 3A is a diagram of the flow in a fluid filter.
Figure 3B:
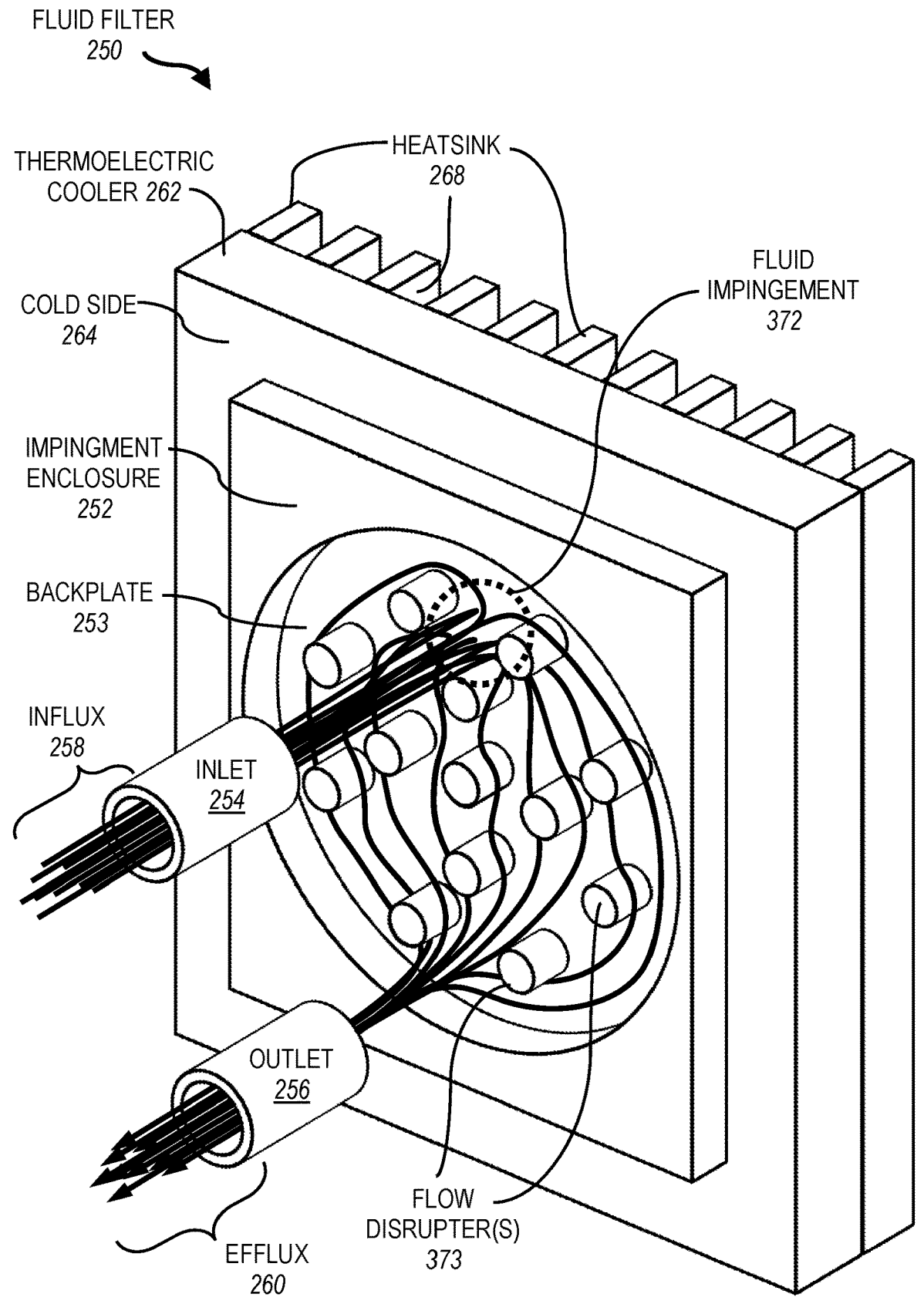
FIG. 3B is a diagram of the flow in a fluid filter with flow disrupters.

Fan 270 is an electromechanical device that may control, generate, or otherwise manage the flow of gaseous matter. In any embodiment, fan 270 can direct and/or generate the flow of gaseous matter across one or more surface(s) of solid matter that is surrounded by that gaseous matter. Accordingly, fan 270 may be used to force the convection (i.e., thermal exchange via surrounding fluidic matter) on one or more devices thereby expediting the rate at which that device is brought to an equilibrium temperature with the surrounding environment. Fan 270 may be coupled on (or near) the elongated arms of heatsink 268 to expedite the convection of heat (i.e., cause forced convection) from heatsink 268 to the surrounding ambient environment.
FIGS. 3A-3B FIG. 3A is a diagram of the flow in a fluid filter. FIG. 3B is a diagram of the flow in a fluid filter with flow disrupters.

Fluid impingement 372 is the rapid redirection of a flowing fluid. In any embodiment, fluid impingement 372 may be caused by placing a structure in the path of a flowing fluid so as to cause an impact between the fluid and the structure. Consequently, when the fluid impacts the structure, the velocity of the fluid is rapidly reduced before being accelerated again to flow through impingement enclosure 252.

In any embodiment, the fluid may include particles of varying size, mass, and density (e.g., aerosols 474) with varying momentum and inertia. Consequently, when a fluid undergoes fluid impingement 372, the particles therein may be separated based on their differing physical properties.

As a non-limiting example, consider a fluid that is mostly gaseous (e.g., nitrogen, oxygen, etc.) with water droplets suspended throughout (i.e., vapor). When flowing with the gaseous matter, the water droplets will have greater kinetic energy (with greater momentum) than the gaseous matter. In turn, when undergoing fluid impingement 372 the water droplets will impact backplate 253 of impingement enclosure 252 "harder" (i.e., impacting with greater force) than the gaseous matter. As a result, the water droplets may remain on the internal walls of impingement enclosure 252, whereas the gaseous matter moves away from the internal walls and resumes flowing through impingement enclosure 252. Consequently, the water droplets may be separated from the gaseous matter of the fluid by forcing the fluid to undergo fluid impingement 372.

In any embodiment, a fluid has a "moisture capacity" that determines the maximum amount of suspended liquid particles that may be dispersed (i.e., as vapor) in the gaseous fluid. If the vapor suspended in a fluid exceeds the moisture capacity of that fluid, the vapor is expelled from the gas as a liquid. Generally, the moisture capacity of a fluid correlates to the temperature of the fluid (i.e., a fluid with less heat has less moisture capacity than a fluid with more heat). Consequently, to extract (e.g., filter, remove) vapor from a fluid, the fluid may be cooled (i.e., have heat removed) to reduce the moisture capacity of the fluid and force the vapor to expel as liquid.

In any embodiment, cold side 264 of thermoelectric cooler 262 removes heat from backplate 253 (and flow disrupters 373) of impingement enclosure 252 thereby making backplate 253. Thus, when the gaseous portion of the fluid contacts the colder surface(s) of backplate 253, flow disrupters 373, and/or other internal surfaces of impingement enclosure 252, heat is removed from the fluid (i.e., via convection). In turn, the temperature of the fluid drops, causing the moisture capacity of the fluid to reduce, and forcing the fluid to expel excess vapor stored therein (e.g., liquid condensing on the internal surfaces of impingement enclosure 252).

Figure 4:
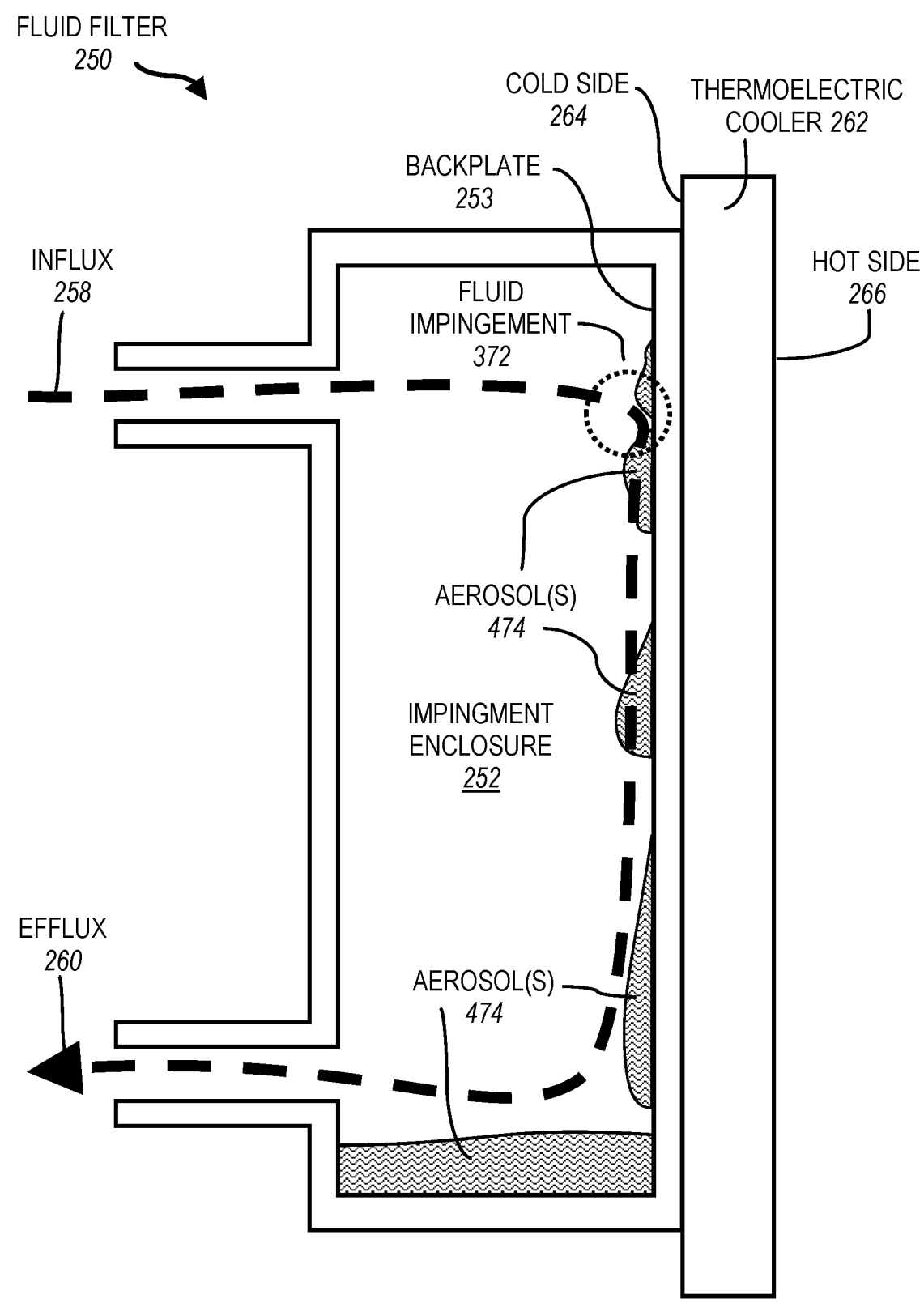
FIG. 4 is a diagram of the flow in a fluid filter showing collection of aerosols.

Flow disrupter 373 is a structure used to impede the flow of fluid within impingement enclosure 252. In any embodiment, flow disrupter 373 may be used to increase the contact surface area and contact duration between impingement enclosure 252 and the fluid. Consequently, further fluid impingement 372 and greater heat transfer (e.g., to cool the fluid) may be achieved (causing additional removal of aerosols 474). Flow disrupter 373 may be actively cooled via contact with cold side 264 of thermoelectric cooler 262. In any embodiment, impingement enclosure 252 may include one or multiple (two or more) flow disrupters 373.
FIG. 4

FIG. 4 is a diagram of the flow in a fluid filter showing collection of aerosols.

Aerosols 474 are solid or liquid particles that are suspended or otherwise dispersed in a gaseous fluid (e.g., the fluid flowing through impingement enclosure 252). Non-limiting examples of aerosol(s) 474 include water droplets, dust particles, and/or any other non-gaseous matter. Aerosols 474 may be separated from the fluid via fluid impingement 372 and/or cooling of the fluid within impingement enclosure 252.

Figure 5:
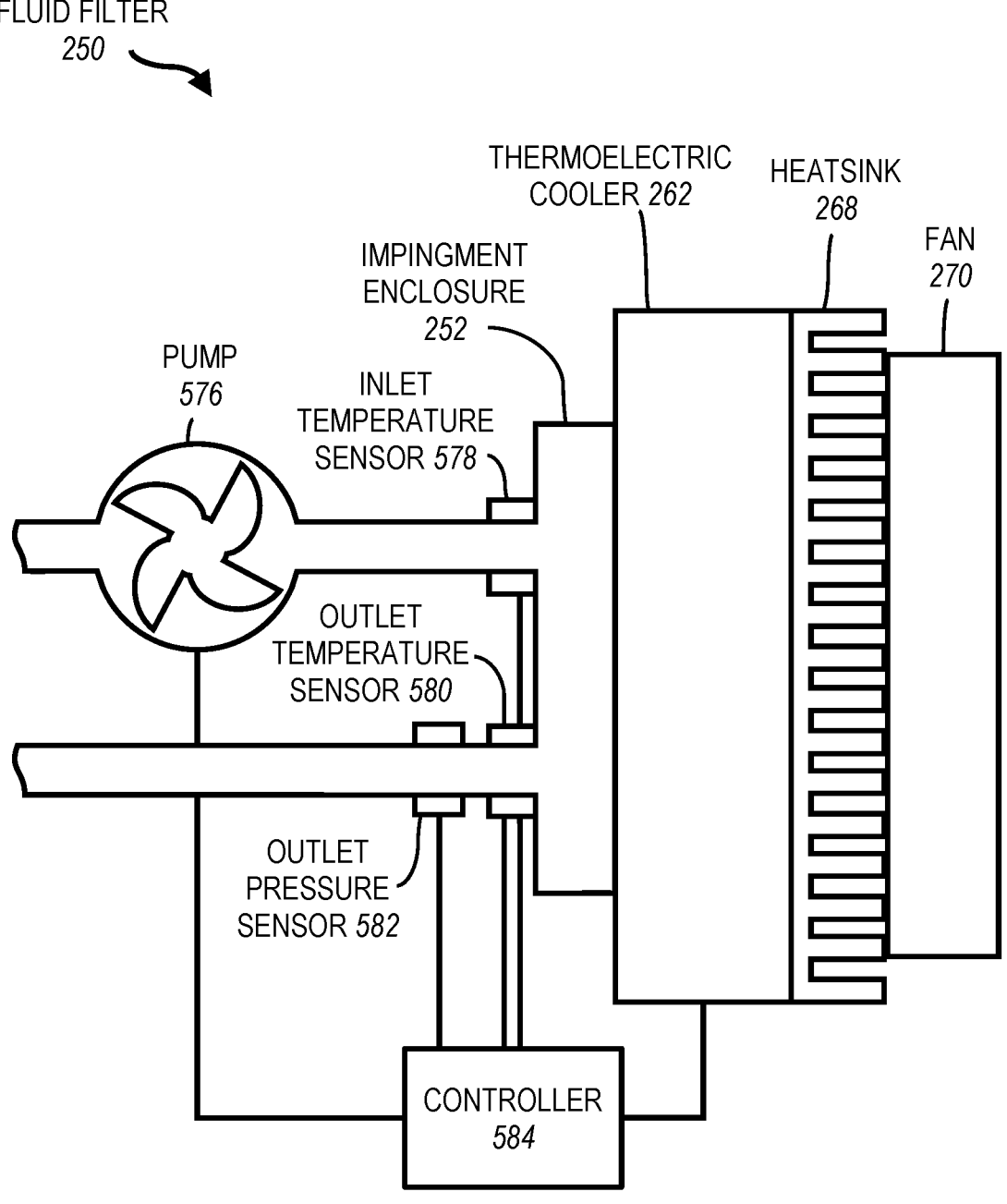
FIG. 5 is a diagram of a fluid filter with attached sensors and controller.

In any embodiment, when separated, aerosols 474 may coalesce and gather in impingement enclosure 252. In any embodiment, impingement enclosure 252 may be oriented such that when aerosols 474 coalesce on a rear wall of impingement enclosure 252, gravity will cause aerosols 474 to travel towards a common end of impingement enclosure 252. In turn, aerosols 474 may be removed from impingement enclosure 252 and fluid filter 250, generally (e.g., via a coalescing filter (not shown)).
FIG. 5

FIG. 5 is a diagram of a fluid filter with attached sensors and controller.

Pump 576 is a machine that may be used to move the fluid through inlet 254, impingement enclosure 252, and outlet 256. Pump 576 may function by adding kinetic energy to the fluid in a specified direction and providing sufficient force to the fluid to overcome any forces counteracting the flow of the fluid (e.g., the fluid's inertia, the friction of the internal flow paths, static head due to gravity, etc.). In any embodiment, pump 576 may have an automatic high pressure bypass valve (e.g., spring loaded) (not shown) that allows the fluid moved out of pump 576 to return to the inlet of pump 576 if the outlet pressure of pump 576 exceeds some maximum threshold. In any embodiment, pump 576 is operatively connected to controller 584.

A temperature sensor may be a thermocouple that produces a difference in voltage (between two conductors) that correlates to the temperature of the junction (joining the two conductors). In turn, that voltage difference may be used to calculate the temperature of the fluid surrounding the junction. One of ordinary skill in the art, provided the benefit of this detailed description, would appreciate what a temperature sensor is, and that any suitable temperature sensor may be used for the disclosed purpose.

Inlet temperature sensor 578 is a temperature sensor used to measure the temperature of the fluid at inlet 254. In any embodiment, inlet temperature sensor 578 is operatively connected to controller 584.

Outlet temperature sensor 580 is a temperature sensor used to measure the temperature of the fluid at outlet 256. In any embodiment, outlet temperature sensor 580 is operatively connected to controller 584. The temperature measured by outlet temperature sensor 580 may be used to indirectly calculate the absolute humidity of the fluid as it flows out of impingement enclosure 252. As a non-limiting example, it may be assumed that the fluid is saturated with vapor (i.e., is at 100% relative humidity) when the fluid exits outlet 256 at 2° C. Thus, the absolute humidity may be calculated as (approximately) 5.56 grams per cubic meter $(g/m^3)$.

Outlet pressure sensor 582 is pressure sensor used to measure the pressure of the fluid at outlet 256 of impingement enclosure 252. In any embodiment, a pressure sensor may be a sensor that converts the pressure exerted by the fluid in the pipes, tubes, conduits, and enclosures of fluid filter 250 into an electrical signal (e.g., a voltage difference). Non-limiting examples of a pressure sensor include a strain gauge (correlating the force exerted by the fluid over an area) or a Venturi meter. In any embodiment, outlet pressure sensor 582 is operatively connected to controller 584.

In any embodiment, outlet pressure sensor 582 may be installed on or near outlet 256 further downstream than a portion of impingement enclosure 252 which may become obstructed. That is, as a non-limiting example, if outlet 256 (or impingement enclosure 252, generally) were to become obstructed (e.g., via frozen fluid), outlet pressure sensor 582 would be further downstream than the obstructed pathway. Thus, in the event of an obstruction of fluid flow, outlet pressure sensor 582 would no longer be exposed to the fluid pressures caused by pump 576. Consequently, during an obstruction of the fluid flow, outlet pressure sensor 582 would experience a lower pressure than if outlet 256 remained unobstructed.

Controller 584 is a computing device used to control one or more components of fluid filter 250 and/or other components attached thereto. In any embodiment, controller 584 may include one or more processor(s), cache, memory, storage, and/or one or more peripheral device(s). Any two or more of these components may be operatively connected via a system bus that provides a means for transferring data between those components. Non-limiting examples of controller 584 include any whole, part, multiple, or combination of a programmable logic controller (PLC), a proportional-integral-derivative (PID) controller, and an information handling system (e.g., 130).

In any embodiment, controller 584 may receive data from inlet temperature sensor 578, outlet temperature sensor 580, and/or outlet pressure sensor 582. In turn, controller 584 may process and analyze that data to control a power state of thermoelectric cooler 262 and/or a power state of pump 576.

In any embodiment, if left uncontrolled, thermoelectric cooler 262 may drop the temperature of efflux 260 and aerosols 474 below freezing. In such an instance, outlet 256 may become blocked by the frozen and solid fluid. Accordingly, it may be desirable to keep the temperature measured by outlet temperature sensor 580 above freezing (e.g., greater than 0° C., 32° F.).

As a non-limiting example, to prevent the fluid and aerosols 474 from freezing and blocking outlet 256, controller 584 may turn off thermoelectric cooler 262 based on the data provided by outlet temperature sensor 580 (i.e., controller 584 may send a command to control the power state of thermoelectric cooler 262). Consider a scenario where controller 584 is a PID controller. Controller 584 may be configured to keep the temperature measured by outlet temperature sensor 580 close to a chosen setpoint (e.g., 3° C.). The PID controller may then account for past (integrative), current (proportional), and predicted (derivative) differences in the setpoint and measured temperatures to control when thermoelectric cooler 262 is on or off.

In any embodiment, if controlling thermoelectric cooler 262 is not sufficiently adequate, and outlet 256 becomes obstructed with frozen fluid and/or aerosols 474, damaging load may be placed on pump 576 (attempting to move the fluid through obstructed outlet 256). Accordingly, it may be desirable to turn off pump 576 in the event that the flow of the fluid's path becomes obstructed, as determined using the pressure measured by outlet pressure sensor 582.

As a non-limiting example, to prevent pump 576 from continuing to operate when outlet 256 is obstructed, controller 584 may turn off pump 576 based on the data provided by outlet pressure sensor 582 (i.e., controller 584 may send a command to control the power state of pump 576).

As a non-limiting example, if the pressure measured by outlet pressure sensor 582 exceeds a threshold (i.e., outlet 256 is frozen downstream from outlet pressure sensor 582) then controller 584 will send a command to pump 576 to power off. As another non-limiting example, if the pressure measured by outlet pressure sensor 582 falls below a threshold (i.e., outlet 256 is frozen upstream from outlet pressure sensor 582) then controller 584 will send a command to pump 576 to power off.

Solutions and Improvements

The methods and systems described above are an improvement over the current technology as the methods and systems described herein provide filtering gaseous hydrocarbons to remove unwanted aerosols. In turn, the filtered hydrocarbon gas allows for more accurate and precise analysis of the chemical composition of the hydrocarbon gases.

Conventional methods to separate gases from liquids on a large scale (e.g., using a degasser) often leave particulate matter (e.g., aerosols, vapor, dust, etc.) dispersed throughout the gaseous output. Consequently, when attempting to analyze the gaseous matter for chemical composition, the lingering debris in the gas may (i) reduce accuracy of the results, (ii) damage the analytical equipment, and/or (iii) preclude the use of more sophisticated and sensitive analytical equipment.

Accordingly, as disclosed herein, systems and methods are provided to further filter a sample of the gas used for analysis. Specifically, the sample gas may be (i) cooled to remove vapor, and/or (ii) undergo fluid impingement to separate the gaseous matter from denser matter (solids and liquids). Consequently, the filtered hydrocarbons gas is purer thereby allowing for the more accurate and precise analysis.

Statements

The systems and methods may comprise any of the various features disclosed herein, comprising one or more of the following statements.

Statement 1. A fluid filter, comprising: a thermoelectric cooler, comprising: a cold side; and a hot side; and an impingement enclosure, comprising: a backplate, disposed against the cold side; and an inlet adapted to direct an influx of a fluid to flow towards the backplate at a perpendicular angle.

Statement 2. The fluid filter of statement 1, wherein the fluid filter further comprises: an outlet adapted to direct the fluid to flow away from the backplate at a second perpendicular angle.

Statement 3. The fluid filter of statements 1-2, wherein the fluid filter further comprises: a plurality of flow disrupters.

Statement 4. The fluid filter of statements 1-3, wherein the impingement enclosure is adapted to cause a fluid impingement of the fluid based on the perpendicular angle.

Statement 5. The fluid filter of statement 4, wherein aerosols coalesce on the backplate due to the fluid impingement.

Statement 6. The fluid filter of statements 1-5, wherein a fluid temperature of the influx is greater than a backplate temperature of the backplate.

Statement 7. The fluid filter of statement 6, wherein the fluid contacting the backplate causes a decrease in the fluid temperature.

Statement 8. The fluid filter of statement 7, wherein aerosols are expelled from the fluid due to the decrease in the fluid temperature.

Statement 9. The fluid filter of statements 1-8, wherein the fluid filter further comprises: a controller operatively connected to the thermoelectric cooler; and an outlet temperature sensor operatively connected to the controller.

Statement 10. The fluid filter of statement 9, wherein the controller is configured to: obtain an outlet temperature from the outlet temperature sensor; make a determination about a power state of the thermoelectric cooler based on the outlet temperature; and send a command to the thermoelectric cooler to change the power state of the thermoelectric cooler.

Statement 11. The fluid filter of statements 1-10, wherein the fluid filter further comprises: a pump adapted to move the fluid through the impingement enclosure; a controller operatively connected to the pump; and an outlet pressure sensor operatively connected to the controller.

Statement 12. The fluid filter of statement 11, wherein the controller is configured to: obtain an outlet pressure from the outlet pressure sensor; make a determination about a power state of the pump based on the outlet pressure; and send a command to the thermoelectric cooler to change the power state of the pump.

Statement 13. A fluid filter, comprising: a thermoelectric cooler with a cold side and a hot side; an impingement enclosure, disposed against the cold side, comprising: an inlet adapted to direct a fluid to flow towards the cold side at a first perpendicular angle; and an outlet adapted to direct the fluid to flow away the cold side at a second perpendicular angle; an outlet temperature sensor disposed at the outlet; and a controller operatively connected to the thermoelectric cooler, wherein the controller is configured to: obtain an outlet temperature from the outlet temperature sensor; make a determination about a power state of the thermoelectric cooler based on the outlet temperature; and send a command to the thermoelectric cooler to change the power state of the thermoelectric cooler.

Statement 14. The fluid filter of statement 13, wherein the determination is to power off the thermoelectric cooler.

Statement 15. The fluid filter of statement 14, wherein the determination is based on a calculation that the outlet temperature will soon drop below freezing.

Statement 16. The fluid filter of statements 13-15, wherein the impingement enclosure is adapted to cause a fluid impingement of the fluid based on the first perpendicular angle.

Statement 17. The fluid filter of statement 16, wherein aerosols coalesce in the impingement enclosure due to the fluid impingement.

Statement 18. The fluid filter of statements 13-17, wherein a fluid temperature is greater than an impingement enclosure temperature of the impingement enclosure.

Statement 19. The fluid filter of statement 18, wherein the fluid contacting the impingement enclosure causes a decrease in the fluid temperature.

Statement 20. The fluid filter of statement 19, wherein aerosols are expelled from the fluid due to the decrease in the fluid temperature.

General Notes

As it is impracticable to disclose every conceivable embodiment of the technology described herein, the figures, examples, and description provided herein disclose only a limited number of potential embodiments. A person of ordinary skill in the relevant art would appreciate that any number of potential variations or modifications may be made to the explicitly disclosed embodiments, and that such alternative embodiments remain within the scope of the broader technology. Accordingly, the scope should be limited only by the attached claims. Further, the compositions and methods are described in terms of "comprising," "containing," or "including" various components or steps, the compositions and methods may also "consist essentially of" or "consist of" the various components and steps. Moreover, the indefinite articles "a" or "an," as used in the claims, are defined herein to mean one or more than one of the elements that it introduces. Certain technical details, known to those of ordinary skill in the relevant art, may be omitted for brevity and to avoid cluttering the description of the novel aspects.

For further brevity, descriptions of similarly named components may be omitted if a description of that similarly named component exists elsewhere in the application. Accordingly, any component described with respect to a specific figure may be equivalent to one or more similarly named components shown or described in any other figure, and each component incorporates the description of every similarly named component provided in the application (unless explicitly noted otherwise). A description of any component is to be interpreted as an optional embodiment- which may be implemented in addition to, in conjunction with, or in place of an embodiment of a similarly-named component described for any other figure.

Lexicographical Notes

As used herein, adjective ordinal numbers (e.g., first, second, third, etc.) are used to distinguish between elements and do not create any ordering of the elements. As an example, a "first element" is distinct from a "second element", but the "first element" may come after (or before) the "second element" in an ordering of elements. Accordingly, an order of elements exists only if ordered terminology is expressly provided (e.g., "before", "between", "after", etc.) or a type of "order" is expressly provided (e.g., "chronological", "alphabetical", "by size", etc.). Further, use of ordinal numbers does not preclude the existence of other elements. As an example, a "table with a first leg and a second leg" is any table with two or more legs (e.g., two legs, five legs, thirteen legs, etc.). A maximum quantity of elements exists only if express language is used to limit the upper bound (e.g., "two or fewer", "exactly five", "nine to twenty", etc.). Similarly, singular use of an ordinal number does not imply the existence of another element. As an example, a "first threshold" may be the only threshold and therefore does not necessitate the existence of a "second threshold".

As used herein, the term "operative connection" (or "operatively connected") means the direct or indirect connection between devices that allows for the transmission of data. For example, the phrase 'operatively connected' may refer to a direct connection (e.g., a direct wired or wireless connection between devices) or an indirect connection (e.g., multiple wired and/or wireless connections between any number of other devices connecting the operatively connected devices).

As used herein, indefinite articles "a" and "an" mean "one or more". That is, the explicit recitation of "an" element does not preclude the existence of a second element, a third element, etc. Further, definite articles (e.g., "the", "said") mean "any one of" (the "one or more" elements) when referring to previously introduced element(s). As an example, there may exist "a processor", where such a recitation does not preclude the existence of any number of other processors. Further, "the processor receives data, and the processor processes data" means "any one of the one or more processors receives data" and "any one of the one or more processors processes data". It is not required that the same processor both (i) receive data and (ii) process data. Rather, each of the steps ("receive" and "process") may be performed by different processors.

As used herein, "machine" means any collection of components assembled to form a tool, structure, or other apparatus. A collection of components may be grouped together and referred to as a single 'machine' based on the functionality of the machine enabled by the combination of the components. As a non-limiting example, a "car engine" is a machine assembled from the components of an engine block, one or more piston(s), a camshaft, etc. that, when combined, function to convert chemical energy into mechanical energy. Further, a machine may be constructed using one or more other machine(s). As a non-limiting example, an automobile may be an assembly of a car engine, a drivetrain, and a steering system—each an independent machine—but assembled to form a larger machine, singularly referred to as an "automobile" which functions to provide transportation.

What is claimed is:

1. A fluid filter, comprising:
a thermoelectric cooler, comprising:
  a cold side; and
  a hot side; and
an impingement enclosure, comprising:
  a backplate, disposed against the cold side;
  an inlet directing an influx of a fluid, comprising gas and aerosols, to flow towards the backplate at a perpendicular angle, wherein the aerosols coalesce into coalesced aerosols in the impingement enclosure; and
  an outlet directing an efflux of the gas and the coalesced aerosols to flow out of the impingement enclosure, wherein the gas and the coalesced aerosols exit from the impingement enclosure via the outlet.

2. The fluid filter of claim 1, wherein the fluid filter does not comprise a separate drain for the coalesced aerosols.

3. The fluid filter of claim 1, wherein the fluid filter further comprises:
a plurality of flow disrupters.

4. The fluid filter of claim 1, wherein the impingement enclosure is adapted to cause a fluid impingement of the fluid based on the perpendicular angle.

5. The fluid filter of claim 4, wherein the aerosols coalesce on the backplate due to the fluid impingement.

6. The fluid filter of claim 1, wherein a fluid temperature of the influx is greater than a backplate temperature of the backplate.

7. The fluid filter of claim 6, wherein the fluid contacting the backplate causes a decrease in the fluid temperature.

8. The fluid filter of claim 7, wherein the aerosols are expelled from the fluid due to the decrease in the fluid temperature.

9. The fluid filter of claim 1, wherein the fluid filter further comprises:
a controller operatively connected to the thermoelectric cooler; and an outlet temperature sensor operatively connected to the controller.

10. The fluid filter of claim 9, wherein the controller is configured to:
obtain an outlet temperature from the outlet temperature sensor;
make a determination about a power state of the thermoelectric cooler based on the outlet temperature; and
send a command to the thermoelectric cooler to change the power state of the thermoelectric cooler.

11. The fluid filter of claim 1, wherein the fluid filter further comprises:
a pump adapted to move the fluid through the impingement enclosure;
a controller operatively connected to the pump; and
an outlet pressure sensor operatively connected to the controller.

12. The fluid filter of claim 11, wherein the controller is configured to:
obtain an outlet pressure from the outlet pressure sensor;
make a determination about a power state of the pump based on the outlet pressure; and
send a command to the pump to change the power state of the pump.

13. A fluid filter, comprising:
a thermoelectric cooler with a cold side and a hot side;
an impingement enclosure, disposed against the cold side, comprising:
  an inlet directing an influx of a fluid, comprising gas and aerosols, to flow towards the cold side at a perpendicular angle, wherein the aerosols coalesce into coalesced aerosols in the impingement enclosure; and
  an outlet directing an efflux of the gas and the coalesced aerosols to flow out of the impingement enclosure, wherein the gas and the coalesced aerosols exit from the impingement enclosure via the outlet;
an outlet temperature sensor disposed at the outlet; and
a controller operatively connected to the thermoelectric cooler, wherein the controller is configured to:
  obtain an outlet temperature from the outlet temperature sensor;
  make a determination about a power state of the thermoelectric cooler based on the outlet temperature; and
  send a command to the thermoelectric cooler to change the power state of the thermoelectric cooler.

14. The fluid filter of claim 13, wherein the determination is to power off the thermoelectric cooler.

15. The fluid filter of claim 14, wherein the determination is based on a calculation that the outlet temperature will soon drop below freezing.

16. The fluid filter of claim 13, wherein the impingement enclosure is adapted to cause a fluid impingement of the fluid based on the perpendicular angle.

17. The fluid filter of claim 16, wherein the aerosols coalesce in the impingement enclosure due to the fluid impingement.

18. The fluid filter of claim 13, wherein a fluid temperature is greater than an impingement enclosure temperature of the impingement enclosure.

19. The fluid filter of claim 18, wherein the fluid contacting the impingement enclosure causes a decrease in the fluid temperature, and wherein the aerosols are expelled from the fluid due to the decrease in the fluid temperature.

20. The fluid filter of claim 13, wherein the fluid filter does not comprise a separate drain for the coalesced aerosols.

\* \* \* \* \*